UNITED STATES PATENT OFFICE.

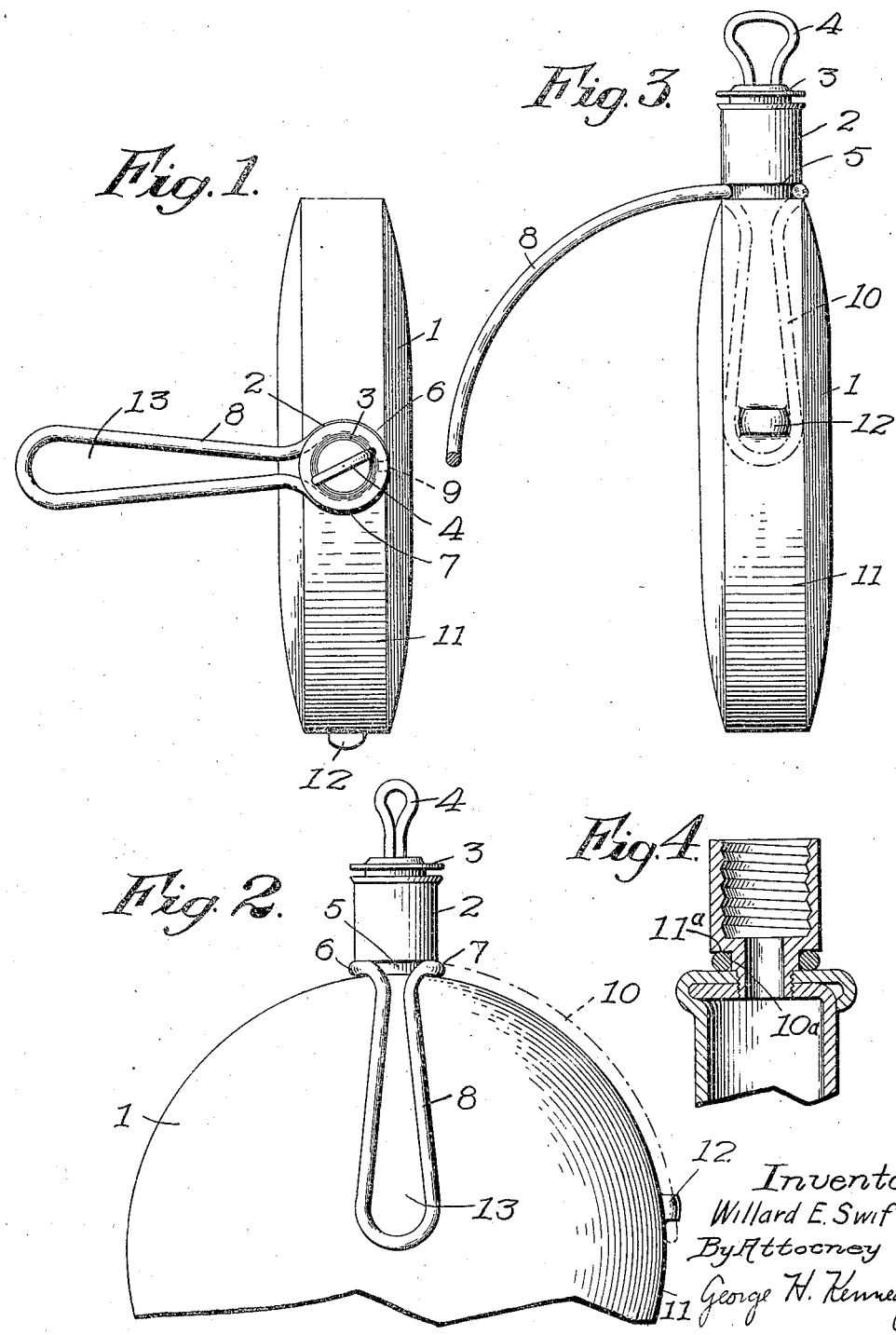

WILLARD E. SWIFT, OF WORCESTER, MASSACHUSETTS.

HOT-WATER BOTTLE.

1,387,953.   Specification of Letters Patent.   Patented Aug. 16, 1921.

Application filed December 17, 1919. Serial No. 345,561.

*To all whom it may concern:*

Be it known that I, WILLARD E. SWIFT, a citizen of the United States, residing at Worcester, in the county of Worcester and Commonwealth of Massachusetts, have invented a new and useful Improvement in Hot-Water Bottles, of which the following, together with the accompanying drawings, is a specification.

The object of my present invention is to provide a hot water bottle, of any desired shape or material, with a handle by which the same may be supported while it is being filled with hot water, with the handle capable of being moved into a position that will not interfere with the use of the hot water bottle. This object, among others, is accomplished by the construction hereinafter described and illustrated in the accompanying drawings, in which—

Figure 1 represents a top view of a hot water bottle, provided with a handle in position to support the bottle while the latter is being filled.

Fig. 2 is a side view of the same, and

Fig. 3 is an edge view of the bottle with the handle shown in sectional view.

Fig. 4 is a view of a portion of a bottle, shown in section though the mouth of the bottle, and illustrating the construction of the shoulder by which the weight of the bottle is supported upon the handle.

Like reference characters refer to like parts in the different figures.

The hot water bottle, represented at 1 in the accompanying drawings, is preferably constructed of a sheet metal, such as aluminum, but the material of which the bottle is composed forms no part of my present invention. The bottle, upon one edge, is provided with a hollow projection 2, forming a mouth through which the bottle is filled and closed when the bottle is in use by a stopple 3 provided with a handle 4. The projection 2 is provided with an annular recess 5 adjacent to the edge of the bottle to receive the curved prongs 6 and 7 of a wire handle 8. The handle 8 is constructed from a piece of resilient wire bent upon itself at its center to form a loop 13, the ends of the wire being brought toward each other and bent to form the curved prongs 6 and 7, which are preferably slightly separated at 9 and sprung into the annular recess 5. When the handle is in the position shown in the accompanying drawings, it is rigidly held in the recess 5 and projects from the side of the bottle in convenient position to be seized by the hand and support the bottle while the latter is being filled.

After the bottle has been filled, the handle 8 is rotated upon the recess 5 into the position over the edge of the bottle indicated by the broken lines 10, Figs. 2 and 3, causing the handle to lie closely against the edge of the bottle and in a position which does not interfere with the use of the bottle for heating purposes.

The bottle represented in the accompanying drawings consists of a flattened disk like structure, circular in shape and having a flattened edge or periphery 11, preferably as wide or wider than the handle 8, to receive the handle when it has been turned from the position shown by full lines in Fig. 2 to that indicated by the broken lines 10 in Figs. 2 and 3.

As the bottle represented in the accompanying drawings is circular in shape, the handle 8 is curved to lie closely against the curved periphery 11 of the bottle, but the handle 8 may be either curved or straight as determined by the shape of the bottle. If the bottle were provided with a straight side adjacent to the projection 2, the handle 8 would be made straight to enable it to correspond to the straight edge of the bottle when turned in the position of the broken lines 10. The prongs 6 and 7 are adapted to pinch the recess 5 with sufficient friction to hold the handle firmly in any position it may be placed. The friction of the prongs 6 and 7 against the wall of the recess 5 is an important feature of my construction as it serves to retain the handle in any position it may be placed by the user. The frictional rotation of the handle about the recess 5 may be secured in any suitable manner, but is conveniently accomplished by the resilience of the wire forming the handle and by the gap 9.

While the construction above described and illustrated in the accompanying drawings is a convenient embodiment of my invention by which I secure the advantages noted, many changes may be made within the scope of my present invention.

The projection on which the handle is journaled is preferably screwed into the body of the bottle as shown in Fig. 4, and provided with a neck $10^a$ surmounted by a shoulder $11^a$ by which the weight of the bottle is supported upon the handle 8, when the handle is in the position shown by full lines in the accompanying drawings. While I have illustrated my invention in connection with a hot water bottle, it is capable of being used on receptacles of various kinds in which the rotatable handle may be brought into an operative position and turned into an inoperative position corresponding with the plane of the receptacle.

I am aware that it has been proposed to support a bottle by a handle which is capable of being compressed about the neck of the bottle and held by the compression of the handle, and I do not claim such. The handle embodying my present invention is a permanent fixture of the bottle and only requires to be rotated about the neck of the bottle to be brought into an inoperative position.

In order to prevent the displacement of the handle 8 when in its inoperative position, I raise a portion of the periphery of the receptacle, as shown at 12, in position to engage the loop 13 of the handle and be sprung over the raised portion as the handle is moved into its inoperative position.

I claim,

1. The combination with a flattened disk shaped receptacle provided on its edge with a hollow projection corresponding substantially with the diametrical axis of the receptacle, said projection having an annular recess, of a handle held in said annular recess and rotatable about the axis of said projection, and means for retaining said handle on the edge of said receptacle.

2. The combination with a flattened disk shaped receptacle, provided on one of its edges with a hollow projection corresponding substantially with the diametrical axis of the receptacle and having an annular recess adjacent to the edge of the receptacle, of a handle consisting of a piece of resilient wire bent at its center upon itself to form a loop, with resilient prongs at its ends to engage said annular recess and rotate therein, with said loop shaped to correspond with the periphery of said receptacle.

3. The combination with a flattened disk shaped receptacle, with a circular periphery having a hollow projection on its edge provided with an annular recess adjacent to the edge of the receptacle, of a handle rotatable about the axis of said projection and curved to fit the circular periphery of said receptacle.

4. The combination with a receptacle having a flat side and a circular projection on its edge, of a handle shaped to correspond with the periphery of the receptacle and rotatable on said projection from an operative position overhanging the flat side of the receptacle to an inoperative position corresponding with the periphery of the receptacle.

5. The combination with a receptacle having one of its sides flattened and a projection on its edge, of a handle for the manual support of the receptacle, said handle being rotatable about said projection from an operative position overhanging the flattened side of the receptacle to an inoperative position over the edge of the receptacle, said projection having means whereby the weight of the receptacle may be supported by said handle when the latter is rotated into its operative position.

Dated December 12, 1919.

WILLARD E. SWIFT.